US012002351B2

(12) United States Patent
Kang

(10) Patent No.: US 12,002,351 B2
(45) Date of Patent: Jun. 4, 2024

(54) REAR SIDE WARNING SYSTEM AND METHOD FOR VEHICLE

(71) Applicant: HYUNDAI MOBIS Co., Ltd., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 322 days.

(21) Appl. No.: 17/531,142

(22) Filed: Nov. 19, 2021

(65) Prior Publication Data

US 2022/0189293 A1 Jun. 16, 2022

(30) Foreign Application Priority Data

Dec. 15, 2020 (KR) ........................ 10-2020-0175318

(51) Int. Cl.
*G08G 1/01* (2006.01)
*G08G 1/052* (2006.01)

(52) U.S. Cl.
CPC ........... *G08G 1/0112* (2013.01); *G08G 1/052* (2013.01)

(58) Field of Classification Search
CPC ...... G08G 1/0112; G08G 1/052; G08G 1/166; G08G 1/167; B60W 30/0953; B60W 50/0097; B60W 50/0098; B60W 50/14; B60W 30/08; B60W 30/18163; B60W 40/072; B60W 40/105; B60W 2520/10; G06V 20/588; B60Y 2300/08; B60Y 2300/18166
See application file for complete search history.

(56) References Cited

U.S. PATENT DOCUMENTS

2005/0128061 A1* 6/2005 Yanai .................... H04N 7/181 348/E7.086
2018/0154935 A1 6/2018 Ohsugi

FOREIGN PATENT DOCUMENTS

EP 2 741 270 A1 6/2014
KR 10-2017-0067562 A 6/2017

OTHER PUBLICATIONS

Extended European Search Report issued in corresponding European Patent Application No. 21208286.1 dated May 9, 2022.

* cited by examiner

*Primary Examiner* — Michael V Kerrigan
(74) *Attorney, Agent, or Firm* — MORGAN, LEWIS & BOCKIUS LLP

(57) ABSTRACT

The present disclosure discloses a system and a method of rear lateral sensing of a vehicle for resetting a monitoring area on the rear lateral side of the vehicle according to a turning angle of the vehicle when the vehicle changes lanes so that a blind spot generated at the time of a lane change is removed, thereby preventing a collision with a vehicle located on the rear lateral side of the vehicle and securing driving stability.

14 Claims, 5 Drawing Sheets

REAR SIDE WARNING SYSTEM AND METHOD FOR VEHICLE

CROSS REFERENCE TO RELATED APPLICATION

The present application claims priority to Korean Patent Application No. 10-2020-0175318, filed Dec. 15, 2020, the entire contents of which is incorporated herein for all purposes by this reference.

BACKGROUND

Technical Field

The present disclosure relates to a system and a method of rear lateral sensing of a vehicle for adjusting a monitoring area on the rear lateral side of the vehicle when the vehicle changes lanes, thereby preventing a collision with a vehicle located on the rear lateral side of the vehicle.

Description of the Related Art

Vehicles are provided with a warning system that warns a driver when it is determined while the vehicle is driving that an obstacle is present in a blind spot located on the rear lateral side or that there is a risk of a collision caused by a vehicle approaching from behind at a high speed in the event of a lane change to the right or left, thereby improving the convenience of the driver.

Specifically, such a rear lateral warning system includes a blind spot detection (BSD) system for notifying the driver when the obstacle is located in the blind spot on the rear lateral side and a lane change assist (LCA) system for determining, and warning of, a possibility of a collision in the event of a lane change of the vehicle with a vehicle approaching from the rear lateral side at a high speed. In particular, a rear lateral warning system that simultaneously implements the BSD and LCA functions to monitor a wide area and effectively warn the driver of risks has been developed in recent years.

The rear lateral warning system according to the conventional art generates a warning when a vehicle having a risk of collision is detected through a radar sensor monitoring the rear lateral side of the vehicle. However, when the host vehicle moves in the lateral direction to change lanes, the driving direction of the host vehicle changes so that the monitoring range of the radar sensor does not include the rear lateral vehicle.

Accordingly, there is a problem that, even when a vehicle entering the rear of the host vehicle is present, the vehicle may not be detected and the risk of an accident increases.

The matters described above as the technical background are intended only for a better understanding of the background of the present disclosure and should not be taken as an acknowledgment that they pertain to the conventional art already known to those skilled in the art.

SUMMARY OF THE DISCLOSURE

The present disclosure is proposed to solve the problem described above, and an object of the present disclosure is to provide a system and a method of rear lateral sensing of a vehicle for adjusting a real lateral monitoring area of the vehicle when the vehicle changes lanes, thereby preventing a collision with a vehicle located on the rear lateral side of the vehicle.

In order to achieve the object described above, the rear lateral sensing system of the vehicle according to the present disclosure includes a rear sensing device setting a monitoring area in the rear of the vehicle and detecting a rear vehicle; a driving determination device catching the driving intention of the vehicle and checking whether the vehicle turns; and a controller resetting the monitoring area of the rear sensing device according to the turning angle of the vehicle when it is confirmed by the driving determination device that the vehicle turns.

A front sensing device checking a road condition in front of the vehicle is further included. The driving determination device receives information on lanes inputted through the front sensing device and further checks whether the vehicle turns and changes lanes, and the controller resets the monitoring area of the rear sensing device according to the turning angle of the vehicle when the vehicle changes lanes.

When the vehicle turns, the driving determination device checks whether the vehicle changes lanes based on the turning angle and driving speed of the vehicle in the turning direction.

The controller checks whether the monitoring area is normally set by setting the monitoring area with the monitoring lines defined based on the preset monitoring points and checking whether an arbitrary point is located in the monitoring area.

When it is confirmed by the driving determination device that the vehicle drives straight ahead, the controller causes the rear sensing device to detect the rear vehicle in the preset monitoring area.

When it is confirmed by the driving determination device that the vehicle turns, the controller resets the monitoring area by adjusting the monitoring points according to the turning angle and defining the monitoring lines based on the adjusted monitoring points.

The controller checks whether the reset monitoring area is normally set by checking whether an arbitrary point is located in the reset monitoring area.

On the other hand, the rear lateral sensing method of a vehicle according to the present disclosure includes a rear sensing step of detecting a rear vehicle entering the monitoring area set in the rear of the vehicle; a driving determination step of catching driving intention of the vehicle and checking whether the vehicle turns; and a control step of resetting the monitoring area in the rear sensing step according to the turning angle of the vehicle when it is confirmed in the driving determination step that the vehicle turns.

A front sensing step of checking a current driving lane in front of the vehicle is further included. Whether the vehicle turns and changes lanes is further checked in the driving determination step, and the monitoring area is reset according to the turning angle of the vehicle when the vehicle changes lanes in the control step.

When the vehicle turns, whether the vehicle changes lanes is checked based on the turning angle and driving speed of the vehicle in the turning direction in the driving determination step.

Whether the monitoring area is normally set is checked by setting the monitoring area with the monitoring lines defined based on the preset monitoring points and checking whether an arbitrary point is located in the monitoring area in the control step.

When it is confirmed in the driving determination step that the vehicle drives straight ahead, the rear vehicle is detected in the preset monitoring area in the control step.

When it is confirmed in the driving determination step that the vehicle turns, the monitoring area is reset by adjusting the monitoring points according to the turning angle and defining the monitoring lines based on the adjusted monitoring points in the control step.

Whether the reset monitoring area is normally set is checked by checking whether an arbitrary point is located in the reset monitoring area in the control step.

The rear lateral sensing system and method of the vehicle structured as described above resets the monitoring area on the rear lateral side of the vehicle according to the turning angle of the vehicle when the vehicle changes lanes so that the blind spot generated at the time of the lane change is removed, thereby preventing a collision with a vehicle located on the rear lateral side of the vehicle and securing the driving stability.

DETAILED DESCRIPTION OF THE DISCLOSURE

A system and a method for rear lateral sensing of a vehicle according to a preferred embodiment of the present disclosure will be described with reference to the accompanying diagrams in the following.

Figure 1:
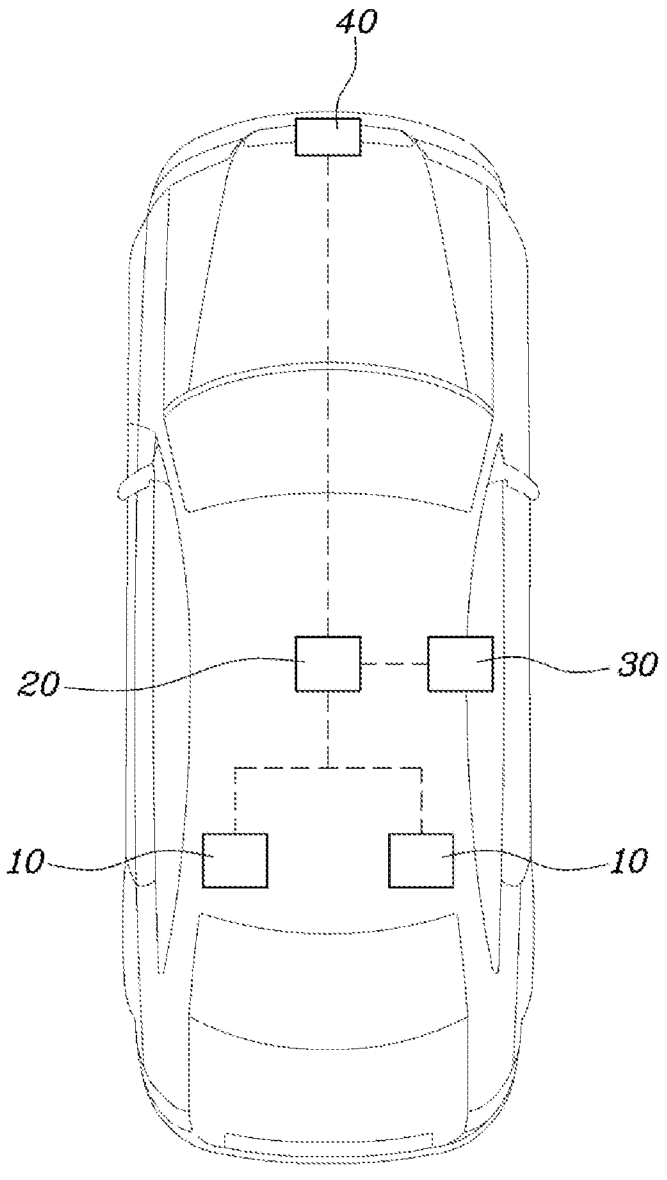
FIG. 1 is a block diagram showing a rear lateral sensing system of a vehicle according to the present disclosure.
Figure 2:
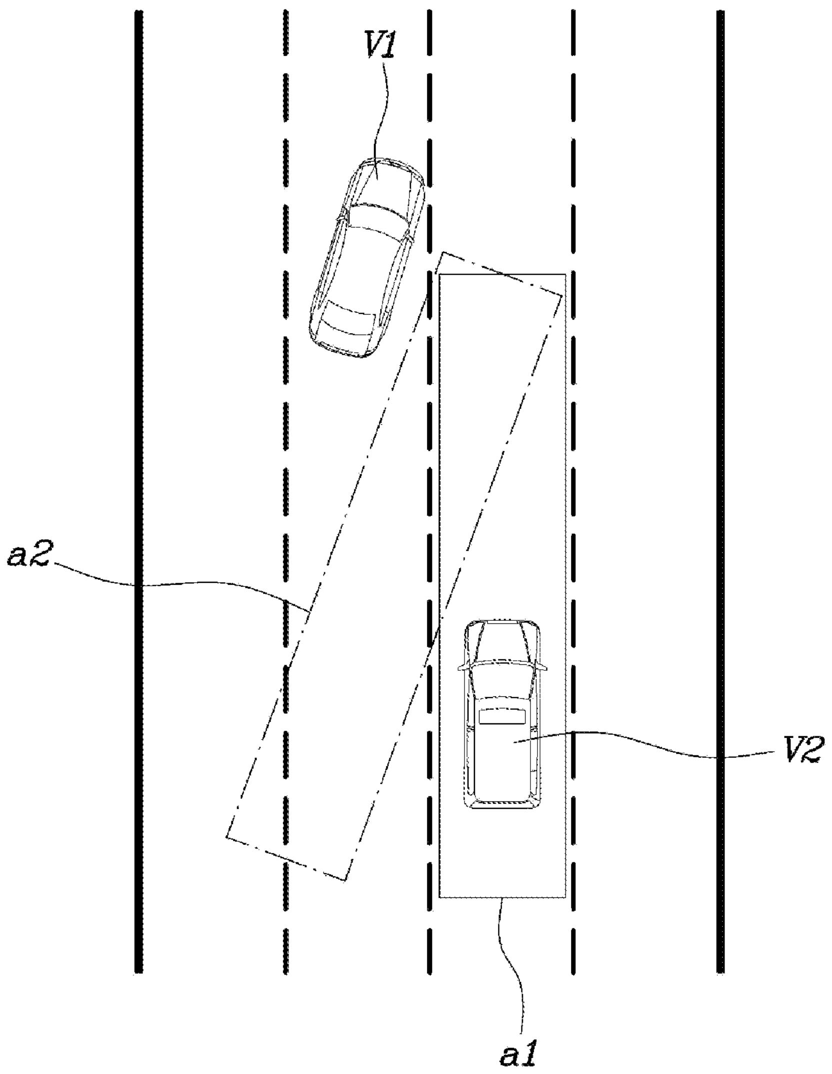
FIGS. 2 to 4 are diagrams for describing the rear lateral sensing system of the vehicle shown in FIG. 1.
Figure 3:
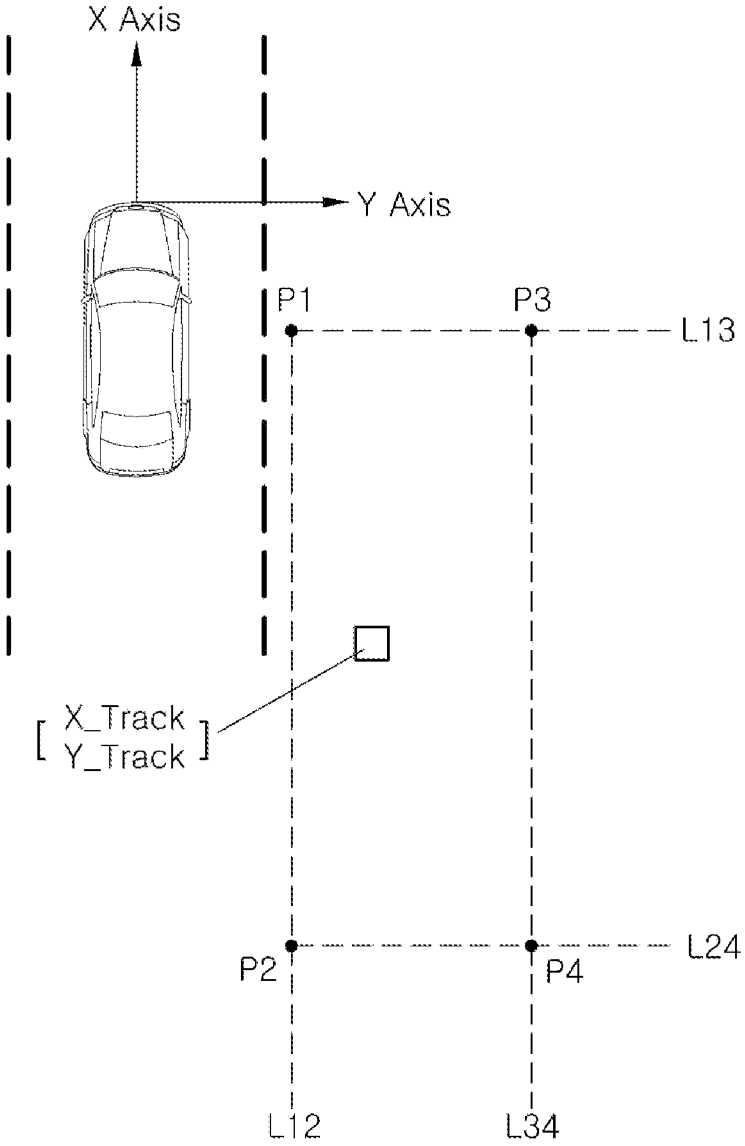
Figure 4:
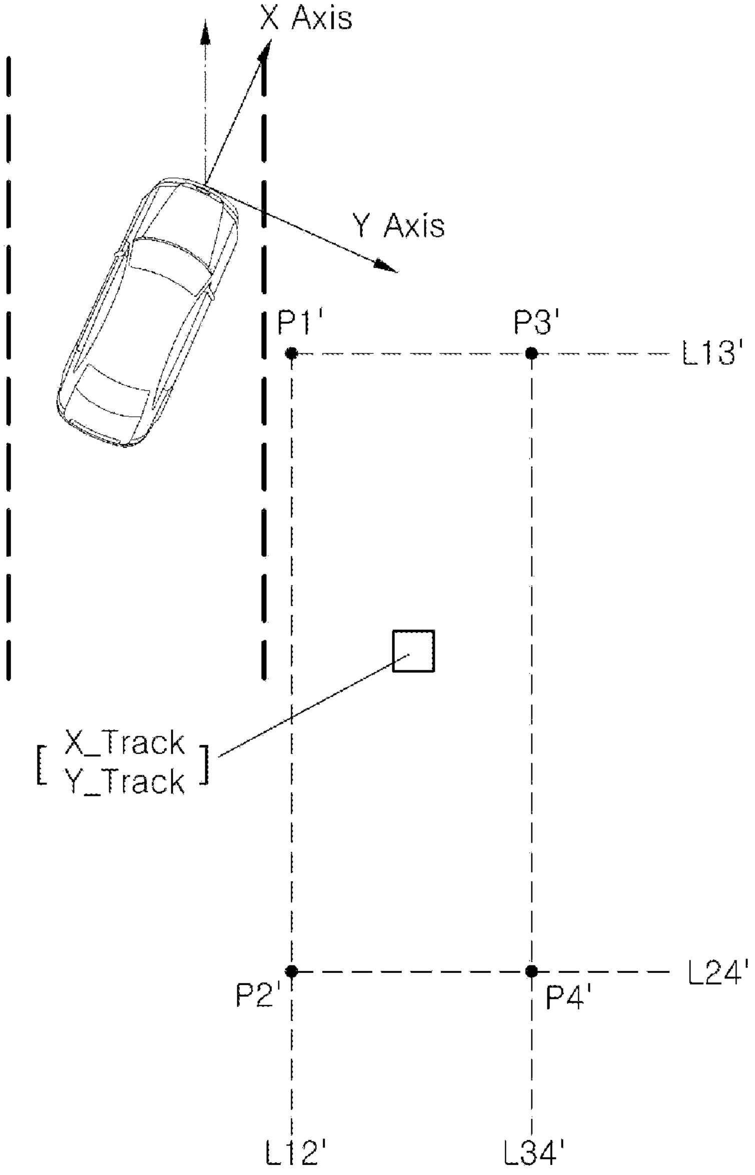
Figure 5:
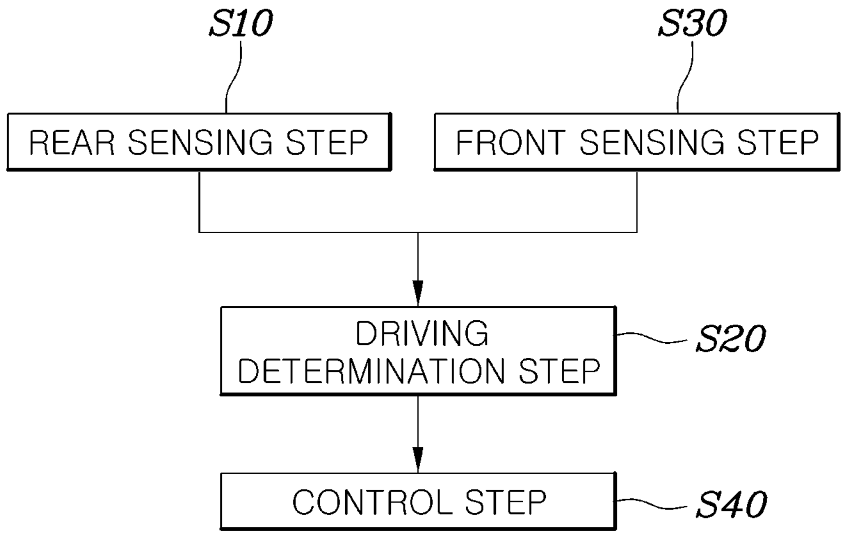
FIG. 5 is a flowchart of a rear lateral sensing method of a vehicle according to the present disclosure.

FIG. 1 is a block diagram showing a rear lateral sensing system of a vehicle according to the present disclosure, FIGS. 2 to 4 are diagrams for describing the rear lateral sensing system of the vehicle shown in FIG. 1, and FIG. 5 is a flowchart of a rear lateral sensing method of a vehicle according to the present disclosure.

As shown in FIG. 1, the rear lateral sensing system according to the present disclosure includes a rear sensing device 10 setting a monitoring area in the rear of the vehicle and detecting a rear vehicle; a driving determination device 20 catching the driving intention of the vehicle and checking whether the vehicle turns; and a controller 30 resetting the monitoring area of the rear sensing device 10 according to the turning angle of the vehicle when it is confirmed by the driving determination device 20 that the vehicle turns.

The rear sensing device 10 detects obstacles including a rear vehicle located in the rear of the vehicle. The rear sending unit 10 may consist of a radar sensor, an ultrasonic sensor, or a camera sensor and may sense a relative distance to the rear vehicle, a moving direction, a moving speed, and the like. The rear sensing device 10 forms a monitoring area in the rear of the vehicle accordingly. In addition, the rear sensing device 10 is configured to adjust a generation location of the monitoring area. To this end, the rear sensing device 10 may have a linkage structure or a rank-and-pinion structure.

In one exemplary embodiment of the present disclosure, a processor may perform various functions, which are described below, of the driving determination device 20 and the controller 30. The processor has an associated non-transitory memory storing software instructions which, when executed by the processor, provides the functionalities of the driving determination device 20 and the controller 30 of the rear lateral sensing system. Herein, the memory and the processor may be implemented as separate semiconductor circuits. Alternatively, the memory and the processor may be implemented as a single integrated semiconductor circuit. The processor may embody one or more processor(s). Each of the driving determination device 20 and the controller 30 may process signals transmitted between elements of the rear lateral sensing system.

The driving determination device 20 catches the driving intention of the vehicle and checks whether the vehicle turns. That is, the driving determination device 20 is for checking whether the vehicle turns and catches the driving direction of the vehicle through a blinking of a turn signal or a steering wheel sensor.

When it is confirmed by the driving determination device that the vehicle turns, the controller 30 resets the monitoring area of the rear sensing device 10 according to the turning angle of the vehicle. That is, when the host vehicle V1 turns, the generation location of the monitoring area by the rear sensing device 10 changes along with the driving direction of the host vehicle V1. As shown in FIG. 2, when the host vehicle V1 turns to change lanes, the generation location of the monitoring area changes by as much as the turning angle of the host vehicle from the monitoring area a1 that should be normally generated by the rear sensing device 10 to the monitoring area a2. When the generation location of the monitoring area changes as the host vehicle V1 turns, the vehicle V2 approaching from behind may not be accurately detected. Accordingly, when it is confirmed that the host vehicle V1 turns, the controller 30 resets the monitoring area of the rear sensing device 10 according to the turning angle of the host vehicle V1. Here, the reset monitoring area may be adjusted by the controller 30 based on the monitoring area generated on the rear lateral side when the vehicle drives straight ahead.

As described above, the present disclosure resets the monitoring area on the rear lateral side of the vehicle according to the turning angle of the vehicle when the vehicle changes lanes so that the blind spots generated at the time of lane change is removed, thereby preventing a collision with a vehicle located on the rear lateral side of the vehicle and securing the driving stability.

More specifically, a front sensing device 40 checking the road condition in front of the vehicle is further included. The front sensing device 40 may consist of a camera sensor, and the road condition in front of the vehicle may refer to a driving lane.

The driving determination device 20 receives information on the lanes inputted through the front sensing device 40 and further checks whether the vehicle turns and changes lanes. Generally, even if the vehicle turns, the risk of an accident decreases when the vehicle follows the lane. However, the risk of collision with a vehicle approaching from the rear lateral side increases when the vehicle changes lanes. Accordingly, the driving determination device 20 receives information on the lanes and checks whether the vehicle turns and changes lanes.

To this end, when the vehicle turns, the driving determination device 20 may check whether the vehicle changes lanes based on the turning angle and driving speed of the vehicle in the turning direction. That is, when the vehicle turns, the driving determination device 20 may check whether the vehicle changes lanes based on the turning angle and driving speed of the host vehicle moving toward the lane checked by the front sensing device 40.

At this time, the driving determination device 20 may further check whether the vehicle is entering the lane within a preset set time based on the turning angle and driving speed of the host vehicle and may more accurately catch the lane change intention of the host vehicle.

For example, when the host vehicle turns and changes lanes, the moving time for the host vehicle to enter the lane is calculated based on the turning angle and driving speed of the host vehicle. The driving determination device 20 determines that the host vehicle has no intention to change lanes when the calculated moving time is less than the set time and determines that the host vehicle intends to change lanes when the moving time is equal to or longer than the set time.

When it is confirmed by the driving determination device 20 that the vehicle changes lanes in this way, the controller 30 resets the monitoring area of the rear sensing device 10 according to the turning angle of the vehicle. In addition, the information on the lanes acquired by the sensing device 40 is used as a source for the controller 30 to reset the monitoring area of the rear sensing device 10 according to the turning angle of the vehicle. This will be described in detail below.

The controller 30 may check whether the monitoring area is normally set by setting the monitoring area with the monitoring lines defined based on the preset monitoring points and checking whether an arbitrary point is located in the monitoring area.

Here, the monitoring points preset in the controller 30 may be set based on a state in which the host vehicle drives straight ahead, and an arbitrary point may be set on a road corresponding to the lane next to the current driving lane of the host vehicle. That is, as shown in FIG. 3, the controller 30 may set the straight driving direction of the vehicle as the 'X' axis and the lateral direction as the 'Y' axis in a state where the vehicle drives straight ahead. The state where the host vehicle drives straight ahead is an initial state that may serve as a reference location, and the respective monitoring points may be determined accordingly. In addition, the arbitrary point may be set arbitrarily on the rear lateral side in the lane next to the lane in which the host vehicle is located and may be set according to the distance between the host vehicle and the rear vehicle.

The monitoring points may be set in the controller 30 in the following manner.

As shown in FIG. 3, in a warning area through the rear sensing device 10, Y_min may be a lower limit in the lateral direction, Y_max may be an upper limit in the lateral direction, X_max may be an upper limit in the longitudinal direction, and X_min may be a lower limit in the longitudinal direction. The warning area is determined to be located where the monitoring area should be set on the rear lateral side of the host vehicle.

Here, the respective monitoring points may be set as shown in the following table.

| | |
|---|---|
| P1 | X_Max<br>Y_Min |
| P2 | X_Min<br>Y_Min |
| P3 | X_Max<br>Y_Max |
| P4 | X_Min<br>Y_Max |

When the respective monitoring points are set in this way, the monitoring lines connecting the respective monitoring points are defined.

| | |
|---|---|
| L12 | y = Y_Min |
| L34 | y = Y_Max |
| L13 | x = X_Max |
| L24 | x = X_Min |

Here, L12 is a line connecting P1 and P2, L34 is a line connecting P3 and P4, L13 is a line connecting P1 and P3, and L24 is a line connecting P2 and P4.

When the respective monitoring lines are defined in this way, the monitoring area may be set inwards of the respective monitoring lines based on this.

In addition, the controller 30 may check whether an arbitrary point is located inwards of the respective monitoring lines in order to determine whether the monitoring area is normally set. The arbitrary point is expressed as a Track with respect to the 'X' and 'Y' axes, which may be expressed as shown in the following table.

| | |
|---|---|
| L12 | $Y\_Min \le Y_{Track}$ |
| L34 | $Y\_Max \ge Y_{Track}$ |
| L13 | $X\_Max \ge X_{Track}$ |
| L24 | $X\_Min \le X_{Track}$ |

When an arbitrary point with respect to the respective monitoring lines satisfies the respective values in this way, the monitoring area is determined to be normally set, and the rear sensing device 10 performs detection of the rear vehicle in the monitoring area.

Accordingly, when it is confirmed by the driving determination device 20 that the vehicle drives straight ahead, the controller 30 causes the rear sensing device 10 to detect the rear vehicle in the preset monitoring area. That is, when it is confirmed that the host vehicle drives straight ahead, the rear vehicle is detected in the monitoring area set in the state of initial straight driving, so that detection of the rear lateral vehicle may be normally performed.

On the other hand, when it is confirmed by the driving determination device 20 that the vehicle turns, the controller 30 may reset the monitoring area by adjusting the monitoring points according to the turning angle and defining the monitoring lines based on the adjusted monitoring points.

Here, the controller 30 checks whether the reset monitoring area is normally set by checking whether an arbitrary point is located in the reset monitoring area.

That is, when it is confirmed by the driving determination device 20 that the vehicle turns and changes lanes, the controller 30 adjusts the monitoring points according to the turning angle. As shown in FIG. 4, as the host vehicle turns, a turning angle relative to the straight driving is generated. The turning angle may be determined by checking the angle between the host vehicle and the moving direction of the host vehicle, through the steering wheel angle, or the like.

Accordingly, the respective monitoring points may be set in the following manner.

| | |
|---|---|
| P1' | $\begin{bmatrix} X\_P1' \\ Y\_P1' \end{bmatrix} = \begin{bmatrix} \cos(HA) & \sin(HA) \\ -\sin(HA) & \cos(HA) \end{bmatrix} \begin{bmatrix} X\_Max \\ Y\_Min \end{bmatrix}$ |

-continued

| | |
|---|---|
| P2' | $\begin{bmatrix} X\_P2' \\ Y\_P2' \end{bmatrix} = \begin{bmatrix} \cos(HA) & \sin(HA) \\ -\sin(HA) & \cos(HA) \end{bmatrix} \begin{bmatrix} X\_Min \\ Y\_Min \end{bmatrix}$ |
| P3' | $\begin{bmatrix} X\_P3' \\ Y\_P3' \end{bmatrix} = \begin{bmatrix} \cos(HA) & \sin(HA) \\ -\sin(HA) & \cos(HA) \end{bmatrix} \begin{bmatrix} X\_Max \\ Y\_Max \end{bmatrix}$ |
| P4' | $\begin{bmatrix} X\_P4' \\ Y\_P4' \end{bmatrix} = \begin{bmatrix} \cos(HA) & \sin(HA) \\ -\sin(HA) & \cos(HA) \end{bmatrix} \begin{bmatrix} X\_Min \\ Y\_Max \end{bmatrix}$ |

As the vehicle turns, the respective monitoring points are reset according to the turning angle in this way. When the respective monitoring points P1', P2', P3', and P4' are set, the monitoring lines connecting the respective monitoring points are defined.

| | |
|---|---|
| L12' | $y = \frac{Y\_P2' - Y\_P1'}{X\_P2' - X\_P1'} \cdot x + \left(Y_{P2'} - \frac{Y'_{P2} - Y'_{P1}}{X'_{P2} - X'_{P1}} \cdot X\_P2'\right) = f(x)$ |
| L34' | $y = \frac{Y\_P4' - Y\_P3'}{X\_P4' - X\_P3'} \cdot x + \left(Y_{P4'} - \frac{Y'_{P4} - Y'_{P3}}{X'_{P4} - X'_{P3}} \cdot X\_P4'\right) = g(x)$ |
| L13' | $y = \frac{Y\_P3' - Y\_P1'}{X\_P3' - X\_P1'} \cdot x + \left(Y_{P3'} - \frac{Y'_{P3} - Y'_{P1}}{X'_{P3} - X'_{P1}} \cdot X\_P3'\right) = h(x)$ |
| L24' | $y = \frac{Y\_P4' - Y\_P2'}{X\_P4' - X\_P2'} \cdot x + \left(Y_{P4'} - \frac{Y'_{P4} - Y'_{P2}}{X'_{P4} - X'_{P2}} \cdot X\_P4'\right) = i(x)$ |

Here, L12' is a line connecting P1' and P2', L34' is a line connecting P3' and P4', L13' is a line connecting P1' and P3', and L24' is a line connecting P2' and P4'. When the respective monitoring lines are defined in this way, the monitoring area may be defined inwards of the respective monitoring lines based on this.

In addition, the controller 30 may check whether an arbitrary point is located inwards of the respective monitoring lines in order to determine whether the monitoring area is normally set. The arbitrary point is expressed as Track with respect to 'X' and 'Y' axes, which may be expressed in the following manner.

| | |
|---|---|
| L12' | $f(X_{Track}) \leq Y_{Track}$ |
| L34' | $g(X_{Track}) \geq Y_{Track}$ |
| L13' | $h^{-1}(Y_{Track}) \geq X_{Track}$ |
| L24' | $i^{-1}(Y_{Track}) \leq X_{Track}$ |

When an arbitrary point with respect to the respective monitoring lines satisfies the respective values in this way, the monitoring area may be determined to be normally set, and the rear sensing device 10 performs detection of the rear vehicle in the relevant monitoring area.

When it is confirmed by the driving determination device 20 that the vehicle turns in this way, the controller 30 adjusts the monitoring points according to the turning angle and resets the monitoring area with the monitoring lines defined based on the adjusted monitoring points so that the blind spot generated as the vehicle turns is removed, thereby preventing a collision with a vehicle located on the rear lateral side of the vehicle and securing the driving stability.

On the other hand, as shown in FIG. 5, a rear lateral sensing method according to the present disclosure includes a rear sensing step S10 of detecting a rear vehicle entering a monitoring area set in the rear of the vehicle; a driving determination step S20 of catching driving intention of the vehicle and checking whether the vehicle turns; a control step S40 of resetting the monitoring area in the rear sensing step S10 according to a turning angle of the vehicle when it is confirmed in the driving determination step S20 that the vehicle turns.

Through this, the present disclosure resets the monitoring area on the rear lateral side of the vehicle according to the turning angle of the vehicle when the vehicle changes lanes so that the blind spot generated at the time of the lane change is removed, thereby preventing a collision with a vehicle located on the rear lateral side of the vehicle and securing the driving stability.

In addition, a front sensing step S30 of checking a current driving lane in front of the vehicle is further included. Whether the vehicle turns and changes lanes is further checked in the driving determination step S20, and the monitoring area may be reset in the control step according to the turning angle when the vehicle changes lanes.

Here, when the vehicle turns, whether the vehicle changes lanes is checked based on the turning angle and driving speed of the vehicle in the turning direction in the driving determination step S20.

On the other hand, whether the monitoring area is normally set may be checked by setting the monitoring area with the monitoring lines defined based on the preset monitoring points and checking whether an arbitrary point is located in the monitoring area in the control step S40.

Here, the monitoring points preset in control step S40 may be set based on a state where the host vehicle drives straight ahead, and an arbitrary point may be set in the lane next to the current lane of the host vehicle. The state where the host vehicle drives straight ahead is an initial state that may serve as a reference location in this way, and the respective monitoring points may be determined accordingly.

When it is confirmed in the driving determination step S20 that the vehicle drives straight ahead, the rear vehicle may be detected in the preset monitoring area accordingly in the control step.

On the other hand, when it is confirmed in the driving determination step S20 that the vehicle turns, the monitoring area may be reset by adjusting the monitoring points according to the turning angle and defining the monitoring lines based on the adjusted monitoring points in the control step. In addition, whether the reset monitoring area is normally set may be checked by checking whether an arbitrary point is located in the reset monitoring area in the control step S40.

In this way, when it is confirmed in the driving determination step S20 that the vehicle turns, the monitoring points according to the turning angle is adjusted and the monitoring area is reset with the monitoring lines defined based on the adjusted monitoring points in the control step so that the blind spot generated when the vehicle turns is removed, thereby preventing a collision with a vehicle located on the rear lateral side of the vehicle and securing the driving stability.

Specific embodiments of the present disclosure are illustrated and described above, but it will be self-evident to those skilled in the art that the present disclosure may be improved upon and modified in various ways within the scope not departing from the technical spirit of the present disclosure provided by the patent claims below.

What is claimed is:

1. A rear lateral sensing system of a vehicle, comprising:

a rear sensing device setting a monitoring area in a rear of the vehicle and detecting a rear vehicle;

a driving determination device determining driving intention of the vehicle and checking whether the vehicle turns; and a controller resetting the monitoring area of the rear sensing device according to a turning angle of the vehicle when the driving determination device confirms that the vehicle turns.

2. The rear lateral sensing system of the vehicle according to claim 1 further comprising a front sensing device checking a road condition in front of the vehicle, wherein the driving determination device receives information on lanes inputted through the front sensing device and further checks whether the vehicle turns and changes lanes, and the controller resets the monitoring area of the rear sensing device according to the turning angle of the vehicle when the vehicle changes lanes.

3. The rear lateral sensing system of the vehicle according to claim 2, wherein, when the vehicle turns, the driving determination device checks whether the vehicle changes lanes based on the turning angle and a driving speed of the vehicle in a turning direction.

4. The rear lateral sensing system of the vehicle according to claim 2, wherein the controller checks whether the monitoring area is normally set by setting the monitoring area with monitoring lines defined based on preset monitoring points and checking whether an arbitrary point is located in the monitoring area.

5. The rear lateral sensing system according to claim 4, wherein the controller causes the rear sensing device to detect the rear vehicle in the preset monitoring area when the driving determination device confirms that the vehicle drives straight ahead.

6. The rear lateral sensing system of the vehicle according to claim 4, wherein the controller resets the monitoring area by adjusting the monitoring points according to the turning angle and defining the monitoring lines based on the adjusted monitoring points when the driving determination device confirms that the vehicle turns.

7. The rear lateral sensing system of the vehicle according to claim 6, wherein the controller checks whether the reset monitoring area is normally set by checking whether an arbitrary point is located in the reset monitoring area.

8. A rear lateral sensing method of a vehicle, comprising:

a rear sensing step of detecting a rear vehicle entering a monitoring area set in the rear of the vehicle;

a driving determination step of determining driving intention of the vehicle and checking whether the vehicle turns; and a control step of resetting the monitoring area in the rear sensing step according to a turning angle of the vehicle when the vehicle is confirmed to turn in the driving determination step.

9. The rear lateral sensing method of the vehicle according to claim 8 further comprising a front sensing step of checking a current driving lane in front of the vehicle, wherein whether the vehicle turns and changes lanes is further checked in the driving determination step, and the monitoring area is reset according to the turning angle of the vehicle when the vehicle turns in the control step.

10. The rear lateral sensing method of the vehicle according to claim 9, wherein, when the vehicle turns, whether the vehicle changes lanes is checked based on the turning angle and a driving speed of the vehicle in a turning direction in the driving determination step.

11. The rear lateral sensing method of the vehicle according to claim 8, wherein whether the monitoring area is normally set is checked by setting the monitoring area with the monitoring lines defined based on the preset monitoring points and checking whether an arbitrary point is located in the monitoring area in the control step.

12. The rear lateral sensing method of the vehicle according to claim 11, wherein the rear vehicle is detected in the preset monitoring area in the control step when the vehicle is confirmed to drive straight ahead in the driving determination step.

13. The rear lateral sensing method of the vehicle according to claim 11, wherein the monitoring area is reset by adjusting the monitoring points according to the turning angle and defining the monitoring lines based on the adjusted monitoring points in the control step when the vehicle is confirmed to turn in the driving determination step.

14. The rear lateral sensing method of the vehicle according to claim 13, wherein whether the reset monitoring area is normally set is checked by checking whether an arbitrary point is located in the reset monitoring area in the control step.

* * * * *